(12) United States Patent
Bendersky et al.

(10) Patent No.: US 9,953,185 B2
(45) Date of Patent: Apr. 24, 2018

(54) IDENTIFYING QUERY PATTERNS AND ASSOCIATED AGGREGATE STATISTICS AMONG SEARCH QUERIES

(71) Applicant: Google Inc., Mountain View, CA (US)

(72) Inventors: Mike Bendersky, Sunnyvale, CA (US); Donald Metzler, Los Angeles, CA (US); Marc Alexander Najork, Palo Alto, CA (US); Dor Naveh, Sunnyvale, CA (US); Vlad Panait, Marina del Rey, CA (US); Xuanhui Wang, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 160 days.

(21) Appl. No.: 14/950,052

(22) Filed: Nov. 24, 2015

(65) Prior Publication Data
US 2017/0147834 A1    May 25, 2017

(51) Int. Cl.
G06F 7/04 (2006.01)
G06F 17/30 (2006.01)
(Continued)

(52) U.S. Cl.
CPC ...... *G06F 21/6227* (2013.01); *G06F 17/3053* (2013.01); *G06F 17/3064* (2013.01);
(Continued)

(58) Field of Classification Search
CPC .......... G06F 17/3097; G06F 17/30967; G06F 17/30964; G06F 17/30991;
(Continued)

(56) References Cited

U.S. PATENT DOCUMENTS 6,185,558 B1 * 2/2001 Bowman ........... G06F 17/30646
705/37
7,092,936 B1 * 8/2006 Alonso ............. G06F 17/30672
707/737
(Continued)

OTHER PUBLICATIONS

International Search Report and Written Opinion of PCT Ser. No. PCT/US2016/063175 dated Feb. 20, 2017.

*Primary Examiner* — Trong Nguyen
(74) *Attorney, Agent, or Firm* — Middleton Reutlinger (57) ABSTRACT

In various implementations, a plurality of non-private n-grams that satisfy a privacy criterion may be identified within a search log of private search queries and corresponding post-search activity. A plurality of query patterns may be generated based on the plurality of non-private n-grams. Aggregate search activity statistics associated with each of the plurality of query patterns may be determined from the search log. Aggregate search activity statistics associated with each query pattern may be indicative of search activity associated with a plurality of private search queries in the search log that match the query pattern. In response to a determination that aggregate search activity statistics for a given query pattern satisfy a performance criterion, a methodology for generating data that is presented in response to search queries that match the given query pattern may be altered based on aggregate search activity statistics associated with the given query pattern.

16 Claims, 4 Drawing Sheets

(51) Int. Cl.
*H04N 7/16* (2011.01)
*G06F 21/62* (2013.01)

(52) U.S. Cl.
CPC .... *G06F 17/3097* (2013.01); *G06F 17/30477* (2013.01); *G06F 17/30522* (2013.01); *G06F 17/30867* (2013.01); *G06F 21/6245* (2013.01)

(58) Field of Classification Search
CPC ......... G06F 17/30112; G06F 17/30554; G06F 17/30696; G06F 17/30941; G06F 17/30103; G06F 17/30693; G06F 17/3053; G06F 21/6218; G06F 21/6227; G06F 21/6236; G06F 21/6245; G06F 21/6254; G06F 17/3064; G06F 17/30477; G06F 17/30867; G06F 17/30522
See application file for complete search history.

(56) References Cited

U.S. PATENT DOCUMENTS

| | | |
|---|---|---|
| 8,364,709 B1 | 1/2013 | Das et al. |
| 8,548,981 B1* | 10/2013 | Bhattacharjee ..... G06F 17/3064 707/706 |
| 2008/0154877 A1* | 6/2008 | Joshi ................ G06F 17/30637 |
| 2008/0294630 A1 | 11/2008 | Yan et al. |
| 2014/0089285 A1* | 3/2014 | Gibbs ................... G06F 17/276 707/706 |

* cited by examiner

IDENTIFYING QUERY PATTERNS AND ASSOCIATED AGGREGATE STATISTICS AMONG SEARCH QUERIES

BACKGROUND

A search log of search queries may be useful for determining query patterns common among search queries. The query patterns may be useful for various purposes, such as generating and/or ranking alternative query suggestions, ranking search results, and so forth. However, some search queries may include private user information. This is particularly true in contexts in which the search queries are submitted to systems that are deemed private to the user and/or to an entity with which the user is associated (e.g., her employer). For example, many personal or intra-entity systems such as email systems, filesystems, document management systems, etc., may be searched by users using search queries that are relatively likely to contain private information, such as names, contact information, account numbers, and so forth.

SUMMARY

The present disclosure is generally directed to methods, apparatus and computer-readable media (transitory and non-transitory) for analyzing a search log of search queries (many of which may be private and/or contain potentially private information) and corresponding post-search activity to generate one or more query patterns, without exposing potentially private information to human users. For one or more generated query patterns, aggregate search activity statistics (including statistics about post-search activity) associated with search queries that match the one or more query patterns may be determined. Those one or more query patterns and corresponding aggregate search activity statistics may then be used for various purposes, several of which will be described below. For example, aggregate search activity statistics associated with a given query pattern may be used to alter a methodology used to generate data that is presented to users who submit search queries that match the given query pattern.

In some implementations, a computer implemented method may be provided that includes the steps of: identifying, within a search log of private search queries and corresponding post-search activity, a plurality of non-private n-grams contained in the private search queries that satisfy a privacy criterion; generating, from the search log, based on the plurality of non-private n-grams, a plurality of query patterns; determining, from the search log, aggregate search activity statistics associated with each of the plurality of query patterns, wherein aggregate search activity statistics associated with each query pattern are indicative of search activity associated with a plurality of private search queries in the search log that match the query pattern; and in response to a determination that aggregate search activity statistics for a given query pattern satisfy a performance criterion, altering a methodology for generating data that is presented in response to search queries that match the given query pattern based on aggregate search activity statistics associated with the given query pattern.

This method and other implementations of technology disclosed herein may each optionally include one or more of the following features.

In some implementations, the methodology may be altered so that query suggestions presented in response to search queries that match the given query pattern are ranked based at least in part on the aggregate search activity statistics associated with the given query pattern. In some implementations, the methodology may be altered so that search results presented in response to search queries that match the given pattern are ranked based at least in part on the aggregate search activity statistics associated with the given query pattern.

In some implementations, the privacy criterion may be satisfied by n-grams that occur within the search log at a frequency that satisfies a frequency threshold. In some implementations, the privacy criterion may be satisfied by n-grams that occur within the search log at least a minimum number of times. In some implementations, the generating may include generating a histogram of the non-private n-grams based on how frequently the non-private n-grams occur among the private search queries.

In some implementations, the aggregate search activity statistics associated with each of the plurality of query patterns may include a total number of search queries in the search log that match the query pattern. In some implementations, the aggregate search activity statistics associated with each of the plurality of query patterns includes a number of distinct search queries in the search log that match the query pattern.

In some implementations, the aggregate search activity statistics associated with the given query pattern may include aggregate statistics pertaining to post-search activity associated with a plurality of private search queries in the search log that match the given query pattern. In some implementations, the aggregate post-search activity statistics associated with the given query pattern may include click position statistics associated with the given query pattern. In some implementations, the aggregate post-search activity statistics associated with the given query pattern may include a click rate associated with the given query pattern. In some implementations, the aggregate post-search activity statistics associated with the given query pattern may include an abandonment rate associated with the given query pattern. In some implementations, the performance criteria is satisfied where the abandonment rate satisfies a minimum threshold.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
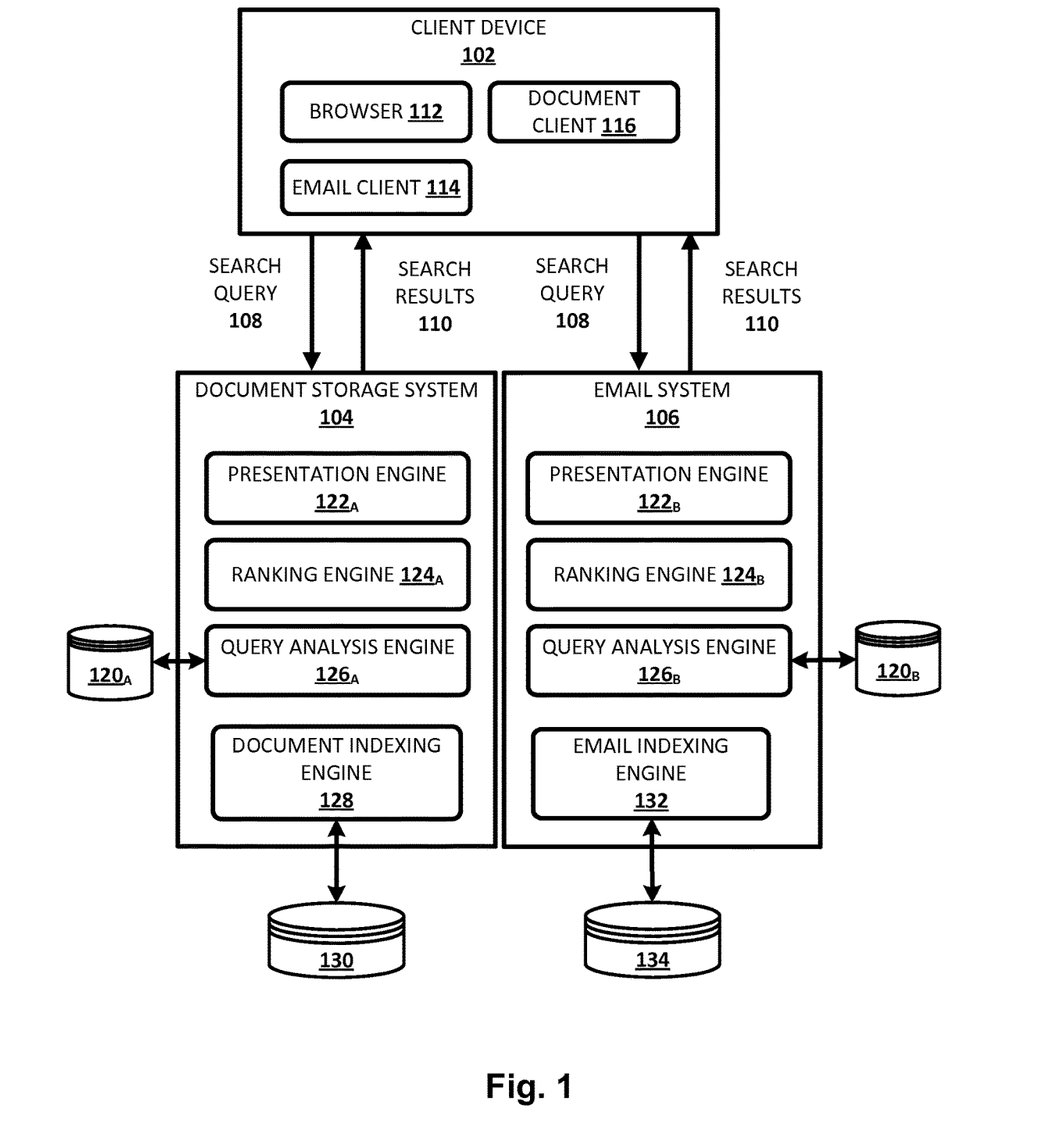
FIG. 1 illustrates an environment in which one or more logs of search queries may be analyzed by various components of the present disclosure to generate query patterns and corresponding aggregate search activity statistics, in accordance with various implementations.

FIG. 1 illustrates an example environment in which users may perform searches on various systems that may be deemed private. The example environment includes a client device 102, a document storage system 104, and an email system 106. Document storage system 104 and/or email system 106 may be implemented in one or more computers that communicate, for example, through a network (not depicted). Document storage system 104 and/or email system 106 are examples of systems in which techniques described herein may be implemented and/or with which systems, components, and techniques described herein may interface.

A user may interact with document storage system 104 and/or email system 106 via client device 102. Document storage system 104 and/or email system 106 may receive search queries 108 from client device 102 and return search results 110 in response to the search queries 108. As used herein, a "search query" 108 may refer to a request for information that may be submitted to a search interface, such as a search engine. In many instances, a search query may include one or more n-grams that collectively form the request for information. However, this is not meant to be limiting. Search queries 108 may come in other forms as well, such as images, audio, and so forth. In some implementations, other computer devices may submit search queries to document storage system 104 and/or email system 106, such as additional client devices and/or one or more servers implementing a service for a website that has partnered with the provider of document storage system 104 and/or email system 106. For brevity, however, the examples are described in the context of client device 102.

In various implementations, client device 102 may be a computer communicatively coupled to document storage system 104 and/or email system 106 through one or more networks (not depicted) such as a local area network (LAN) or wide area network (WAN) such as the Internet. The client device 102 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. Client device 102 typically includes one or more applications to facilitate submission of search queries and the sending and receiving of data over a network. For example, client device 102 may execute one or more applications, such as a browser 112, an email client 114, and/or a document client 116 that allow users to formulate search queries and submit the queries to document storage system 104 and/or email system 106.

In FIG. 1, document storage system 104 includes a presentation engine $122_A$, ranking engine $124_A$, and query analysis engine $126_A$. Likewise, email system 106 includes its own presentation engine $122_B$, ranking engine $124_B$, and query analysis engine $126_B$. However, this is not meant to be limiting. In various implementations, document storage system 104 and email system may be interrelated, e.g., by virtue of being operated by the same entity, and/or by virtue of being accessible by a user using a single set of credentials. In such implementations, document storage system 104 and email system 106 may share a common presentation engine 122, ranking engine 124, and/or query analysis engine 126. For the sake of brevity, unless a specific component of document storage system 104 or email system 106 is being referenced, these components will be referenced generically by the numbers 124, 126, and 128. In some implementations one or more of engines 122, 124, and/or 126 may be omitted, combined, and/or implemented in a component that is separate from document storage system 104 and/or email system 106. In some implementations, one or more of engines 122, 124, and/or 126, or any operative portion thereof, and/or document indexing engine 128 and/or email indexing engine 132 (described below), may be implemented in a component that is executed by client device 102.

Document storage system 104 may provide online storage space for users to store documents, e.g., for free or for a fee. In some implementations, document storage system 104 may be a file storage and synchronization service that hosts documents for users in a manner that is often referred to as "cloud storage." A user may designate a location on a filesystem of a local device operated by the user (e.g., client device 102) for cloud storage. Any documents stored in the cloud storage location of client device 102 may be propagated/synchronized to similarly-designed locations of other devices operated by the user. "Documents" as referred to herein may include web pages, word processing documents, portable document format (PDF) documents, images, emails, videos, and spreadsheets, presentations, multimedia files, photographs, and audio files, to name just a few. Each document may include content such as, for example, text, images, videos, sounds, embedded information (e.g., meta information and/or hyperlinks), and/or embedded instructions (e.g., ECMAScript implementations such as JavaScript).

Document storage system 104 may include a document indexing engine 128 that is configured to maintain an index 130 for use by document storage system 104. Document indexing engine 128 may process documents and update index entries in index 130 using conventional and/or other indexing techniques in order to make documents searchable. In various implementations, a user may be able to submit a search query 108 to document storage system 104 in order to search for documents that the user has stored in designated cloud storage. For example, a user may operate browser 112 to log into a website that operates as an interface to access documents stored on document storage system 104. The website may provide a search bar or other similar interface that enables the user to submit a search query 108, e.g., of one or more n-grams, to find particular documents. Once the search query 108 is uploaded to document storage system 104, document indexing engine 128 may perform various conventional or other techniques to search for documents that match the search query. Additionally or alternatively, a user may operate document client 116, which may appear similar to or even be incorporated into a file manager provided by an operating system of client device 102, in order to search index 130 for documents the user has stored in cloud storage.

In many ways, email system 106 may operate similarly to document storage system 104, except that email system 106 is configured specifically to maintain emails and other information associated with emails, such as attachments, contacts, notes, calendar entries, etc., that are often stored in association with emails. As was the case with document storage system 104, email system 106 includes an email indexing engine 132 that processes emails and related information and updates index entries in index 134 using conventional and/or other indexing techniques in order to make the emails and/or associated information searchable. Thus, for example, a user may operate a search interface of email client 114 to search content of emails, attachments, calendar entries, notes, tasks, reminders, contacts, and so forth. Or, and similarly to document storage system 104, a user may operate browser 112 to log into a web interface for email system 106. The web interface may provide a search bar or similar functionality that enables the user to search email-related content.

In various implementations, document storage system 104 and/or email system 106 may maintain a search log 120. In FIG. 1, separate search logs 120A and 120B are provided for document storage system 104 and email system 106, respectively, but could be consolidated into a single search log in other implementations. Search log 120 may store various attributes of search queries submitted to document storage system 104 and/or email system 106. For example, in some implementations, search log 120 may store, for each submitted search query, a user identifier associated with a user that submitted the query, a timestamp, the full text of the search query (i.e., all n-grams of the query), and so-called post-search activity associated with the search query. "Post-search activity" associated with a particular search query may include but is not limited to activity taken by the user after the search query is submitted and search results are returned. For example, in some implementations, post-search activity may include a rank of a document/search result/graphical element clicked on by the user after the search query was submitted, an indication that no clicks were made (e.g., the user abandoned the search query in favor of other activity, such as submitting a new search query), an indication of some other graphical element that the user clicked on (e.g., a query suggestion, a contact in the email context, etc.) while or after submitting the search query, and so forth.

In this specification, the term "database" and "index" will be used broadly to refer to any collection of data. The data of the database and/or the index does not need to be structured in any particular way and it can be stored on storage devices in one or more geographic locations. Thus, for example, the indices 120, 130, and/or 134 may include multiple collections of data, each of which may be organized and accessed differently.

Presentation engine 122 (including 122$_A$ or 122$_B$) may provide search results 110 for presentation to the user of client device 102. For instance, presentation engine 122 may provide, to client device 102 in response to a search query 108, a list of search results and/or other user interface elements. In some implementations, presentation engine 122 may cause some search results that satisfy various criteria related to relevance, timeliness, etc., to be visually emphasized over or presented before other search results. For instance, some results may be visually emphasized over others using fonts, font sizes, colors, animation, borders, margins, or other visual indicia. In other cases, some results may be presented first, followed by less pertinent search results.

Ranking engine 124 (including 124$_A$ or 124$_B$) may use a respective index (e.g., 130 and/or 134) to identify documents, email-related content, and/or other information responsive to the search query 108, for example, using conventional and/or other information retrieval techniques. In some implementations, ranking engine 124 may calculate scores for the documents, email-related content, and other information identified as responsive to the search query 108, for example, using one or more ranking signals. Each ranking signal may provide information about the document, email-related content, or other information itself, a relationship between the document, email-related content or information and the search query 108, and/or a relationship between the document, email-related content, or information and the user performing the search.

Query analysis engine 126 (126$_A$ or 126$_B$) may be configured to identify, within search log 120 (120$_A$ or 120$_B$ in FIG. 1) of private search queries and corresponding post-search activity, non-private content, such as a plurality of non-private n-grams, contained in the private search queries that satisfy a privacy criterion. So-called "privacy criteria" may come in various forms. For example, in some implementations, a privacy criterion is satisfied by n-grams that occur within search log 120 at a frequency that satisfies a frequency threshold. In some implementations, a privacy criterion is satisfied by n-grams that occur within search log 120 at least a minimum number of times. In some implementations, non-private n-grams and their associated frequencies at which the n-grams are found in search queries stored in search log 120 may be organized into a histogram. Less frequent n-grams, which are more likely to comprise private information, may be discarded or excluded from the histogram.

Based on the non-private content that satisfied the privacy criteria, query analysis engine 126 may take another pass through search log 120 to generate a plurality of so-called query patterns. A "query pattern" may match one or more search queries in search log 120. Query patterns may come in various forms, including but not limited to regular expressions (e.g., "resume *", "* design doc", "white paper*", etc.). "Private" n-grams (i.e., those n-grams that did not satisfy the privacy criteria mentioned above), will not match any of the non-private n-grams, and may be replaced, for instance, by wildcards. Accordingly, query patterns may be stripped of private information that may have been contained in search queries stored in search log 120.

Query analysis engine 126 may also be configured to determine, from search log 120, aggregate search activity statistics associated with each of the plurality of query patterns. In various implementations, "aggregate search activity statistics" associated with each query pattern may be indicative of search activity and post-search activity associated with a plurality of private search queries in search log 120 that match the query pattern.

In various implementations, aggregate search activity statistics associated with a given query pattern may include, for instance: a total and/or unique number of search queries in search log 120 that match the given query pattern; a total and/or unique number of users that submitted search queries that match the given query pattern; semantic types of n-grams observed among search queries that match the given query pattern; n-gram ids used for prefix/suffix matching; and so forth.

In various implementations, aggregate post-search activity statistics associated with a given query pattern may include aggregate data representative of the post search activity described above as being stored in search log 120 in association with each search query. For instance, aggregate post-search activity statistics may include: so-called click position statistics (e.g., did users click a web result, a query suggestion, a contact result?) observed after users submit search queries that match the given query pattern; an abandonment rate (no clicks recorded) by users after submitting search queries that match the given query pattern; an average number of results retrieved across search queries that match the given query pattern; and so forth.

Figure 2:
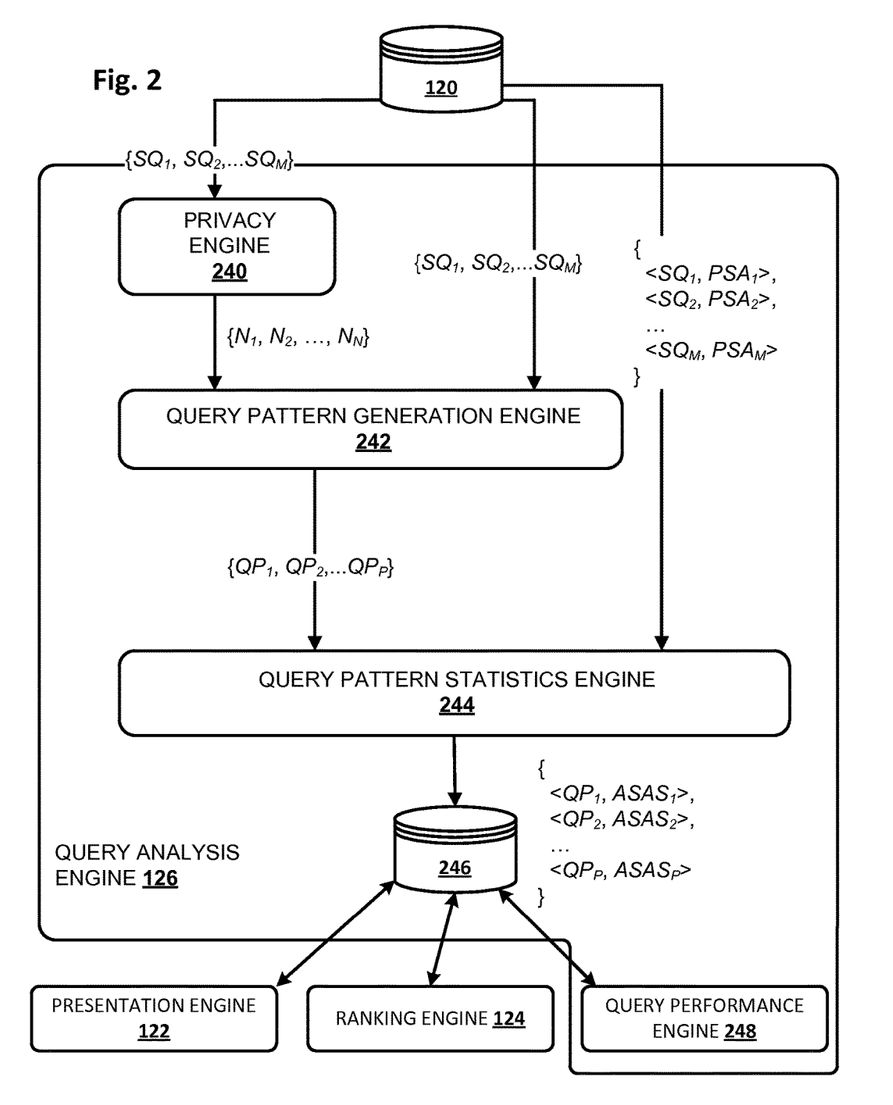
FIG. 2 depicts how private search queries and corresponding post-search activity may be processed to obtain query patterns and associated aggregate search activity statistics, in accordance with various implementations.

FIG. 2 illustrates an example of how various components of document storage system 104 and/or email system 106, and particularly how various (typically, but not necessarily, software) components of query analysis engine 126, may analyze a search log 120 of search queries to generate one or more query patterns and associated aggregate search activity statistics. FIG. 2 also depicts some examples of how the generated query patterns and corresponding statistics may be put to use.

Starting at the top, a plurality of search queries from search log 120, $\{SQ_1, SQ_2, \ldots, SQ_M\}$, may be provided to and/or obtained by a privacy engine 240. Privacy engine 240 may identify, for instance, a plurality of non-private n-grams, $\{N_1, N_2, \ldots, N_N\}$, contained in the private search queries that satisfy a privacy criterion. For example, in some implementations, only n-grams that satisfy frequency thresholds such as being present in search queries submitted by at least x unique users daily, in search queries submitted by at least y unique users weekly, etc., may be considered as non-private n-grams. As noted above, non-private n-grams may be organized in some implementations as a histogram of non-private n-grams and corresponding frequencies.

In various implementations, privacy engine 240 may employ other techniques to identify a plurality of non-private n-grams. For example, in some implementations, privacy engine 240 may analyze an n-gram across multiple search queries in which n-gram appears, e.g., pursuant to an internationalization standard such as i18n, to determine distributions of native languages across the search queries. These distributions may then be used to determine whether the n-gram qualifies as non-private. Other implementations of privacy engine may apply a variety of tokenization, lexical analysis, normalization, and/or stemming techniques. For example, words and phrases contained in search queries may be broken out and then subjected to further processing, which may include, for instance, parsing, text mining, and so forth.

The plurality of search queries, $\{SQ_1, SQ_2, \ldots, SQ_M\}$, also may be provided to or obtained by a query pattern generation engine 242. Query pattern generation engine 242 may use the plurality of non-private n-grams identified by privacy engine 240, $\{N_1, N_2, \ldots, N_N\}$, to generate, from the plurality of search queries, a plurality P of query patterns, $\{QP_1, QP_2, \ldots, QP_P\}$. Query pattern generation engine 242 may employ various techniques to identify query patterns. In some implementations, search queries may be grouped into query patterns by shared prefixes, suffixes, and/or infixes. For example, the search queries "resume Bob Smith," "resume Jane Doe," and "Resume Arnold" all may share the prefix "resume," and thus all match the pattern, "resume [A-z]+". In some implementations, search queries may be matched based on semantics in addition to or instead of syntax. Suppose there is a fourth search query, "CV Allison Jones," stored in search log. While "CV" differs syntactically from "resume," the words have similar meanings. Accordingly, a more robust query pattern may be generated to capture all four search queries, such as "(resume|CV) [A-z]+".

In some implementations, query pattern generation engine 242 may identify query patterns as follows. An attempt may be made to match a given search query, Q, to each non-private non-private n-gram, $N_i$, of the plurality of non-private n-grams, $\{N_1, N_2, \ldots, N_N\}$, that is identified by privacy engine 240. It may be determined whether any of "N *", "* N", and/or "N * N" matches Q (wherein "*" is a wildcard). If none of the three variations matches Q, then Q may be compared to the next non-private n-gram, $N_{i+1}$. If one or more of the three variations matches Q, then query pattern generation engine 242 may save the variation/Q combination as a pattern, and move on to the next non-private n-gram, $N_{i+1}$. By comparing Q to all the identified non-private n-grams, query pattern generation engine 242 may identify the longest n-gram that can be created using Q and a non-private n-gram. For example, suppose privacy engine 240 identifies the following two non-private n-grams, "CV" and "CV DRAFT". Query pattern generation engine 242 may ultimately identify the pattern "CV DRAFT *", over "CV *", because the former is longer.

In some implementations, query pattern generation engine 242 may incorporate semantic information into query patterns it generates. For example, semantic information may be extracted from private n-grams by query pattern generation engine 242, e.g., before the private n-grams are discarded. This extracted semantic information may be used to formulate more finely-tuned wildcards, e.g., wildcards with associated semantic types. For example, and using the above example, the query pattern "(resume|CV) <contact_name>" may be generated by query pattern generation engine 242 when it is observed that the private n-grams that identify the person-of-interest in multiple resume/CV-related search queries constitute contacts (e.g., email contacts) of the users that submitted the search queries.

The output of query pattern generation engine 242, which may be the plurality P of query patterns, or $\{QP_1, QP_2, \ldots, QP_P\}$, may be provided to a query pattern statistics engine 244, along with search queries and post-search activity stored in search log 120, $\{<SQ_1, PSA_1>, <SQ_2, PSA_2>, \ldots, <SQ_M, PSA_M>\}$. Query pattern statistics engine 244 may determine aggregate search activity statistics associated with search queries that match a given query pattern QP. These aggregate statistics can include aggregate post-search activity statistics and other aggregate search activity statistics, which were described above.

The output of query pattern statistics engine 244 may be query patterns and corresponding aggregate search activity statistics, $\{<QP_1, ASAS_1>, <QP_2, ASAS_2>, \ldots, <QP_P, ASAS_P>\}$. This data may be stored in an index 246 (which could be part of search log 120), so that it is accessible to various downstream components, including but not limited to presentation engine 122, ranking engine 124, and/or a query performance engine 248. These components may put the data to use in various ways. For example, one or more of presentation engine 122, ranking engine 124, and/or query performance engine 248, may analyze the data, in real time in response to receipt of a query or at other times (e.g., periodically), to alter a methodology for generating data that is presented in response to search queries that match a given query pattern based on aggregate search activity statistics associated with the given query pattern.

In various implementations, aggregate search activity statistics associated with a given query pattern and stored in index 246 may include so-called "click position" statistics. Click position statistics may refer to statistics about what users clicked or otherwise selected (e.g., retinal monitor could determine selection based on a user looking at it) after submitting search queries that match the given query pattern. Users may click on a particular search result of a list of search results (e.g., the first position, the second, the tenth, etc.). They may click on an advertisement returned in addition to the search results (e.g., before the search results, or to the side). Users may click on so-called "informational results," which may contain pure information, in addition to or instead of a hyperlink. For example, a user who submits the search query "Ronald Reagan" may be presented with, in addition to traditional search results, an excerpt that describes, in summary form, the former president.

Depending on the context, click position statistics may also relate to other items that users may click on after submitting search results. A user that submits a search query 108 to email system 106 in FIG. 1 searching for a particular email may be presented with, e.g., in addition to a list of emails that match the search query, other items that the user can click on, such as email contacts associated with the result emails, such as email contacts of people that have sent/received emails to/from the user that match the search query. A user that submits a search query 108 to document storage system 104 in FIG. 1 searching for a particular document may be presented with, e.g., in addition to a list of documents that match the search query, other items to click on, such as projects to which documents belong, contacts of employees that created/edited/"own" documents, organizations to which documents belong, and so forth. Users may click or otherwise select these various components to generate click position statistics.

In various implementations, presentation engine 122 or another downstream component may analyze click position statistics to alter a methodology used to present various information to a user who submits a search query that matches a query pattern. For example, components located at click positions that achieve relatively high click rates may be surfaced and/or de-emphasized, depending on the circumstances. Suppose that in search queries 108 submitted to email system 106 that match a particular query pattern, sixty percent result in a user clicking on an email contact. Presentation engine 122$_B$ may take this into account when future search queries are received that match the same query pattern, e.g., by presenting email contacts more prominently (or less prominently, if it is desired the users click less often on email contacts).

In addition to or instead of click position statistics, in various implementations, presentation engine 122 or another component may analyze a click rate associated with a given query pattern to determine how it will present results to search queries that match the given pattern. Suppose a particular query pattern has a very low click rate, which may coincide with a high abandonment rate and/or being deemed as a "low performing" query pattern. This may suggest that search queries that match the given query pattern are flawed, e.g., because they contain a common misspelling. Presentation engine 122 or another component may take this into account when future search queries are received that match the same query pattern, e.g., by presenting query suggestions (e.g., as a drop down menu on the search bar, or as separate search results) associated with "higher performing" query patterns. For example, suppose a low performing query pattern is fairly similar to a much higher performing query pattern (e.g., one n-gram is changed). When a search query is received that matches the low performing query pattern, the search query may be used in conjunction with the higher performing query pattern to propose a query suggestion to the user. That query suggestion may correct a misspelling in the original search query.

This technique may have an advantage over traditional spell correction techniques in instances where search queries contain incorrectly-typed terms or phrases that are nonetheless contained in dictionaries typically used by spell correction software. For example, suppose a user intended to search the phrase "no reply," but accidently submitted the search query "no replay." Traditional spell correction software might not catch this error because both "no reply" and "no replay" may include n-grams that are contained in a spell correction dictionary. However, techniques herein may reveal that search queries submitted to email system 106 that contain the phrase "no replay" have very poor performance, but search queries that contain the term "no reply" have very high performance. In such case, presentation engine 122 or another component may present to the user, e.g., as suggested spelling correction, "no reply."

In some implementations, presentation engine 122 may consider attributes of user interface elements that are presented to a user in response to search queries that match a given query pattern, as well as how users tend to interact with those elements. For example, informational results such as those described with respect to Ronald Reagan above may be presented to a user in a separate or distinct user interface element, such as an emphasized region of a search result webpage, or in a pop up window. If users who submit search queries that match a given query pattern tend to click on a particular user interface element after submitting the search, that user interface element may be presented more prominently (e.g., "surfaced") in the future, or at the very least may continue to be presented. On the other hand, if users don't tend to click on the user interface element, then it may be presented less prominently (e.g., in another form), or not presented at all. Or, if it is desired that users click on a relatively unused user interface element more often, then the user interface element may be surfaced or otherwise rendered more prominently to draw additional clicks.

In addition to or instead of presentation engine 122, other components may utilize data stored in index 246 to alter how they cause data to be presented to users. For example, suppose aggregate search activity statistics associated with a given query pattern suggest that users are more likely to click on highly recent, as opposed to highly relevant, search results returned from searches that match the pattern. In such case, ranking engine 124 may weigh a measure of freshness of search results that are responsive to the search query more heavily when ranking the search results than might otherwise be the case. Ranking engine 124 may, in various implementations, provided data indicative of its ranking to presentation engine 122, so that presentation engine 122 can generate the data that is ultimately presented to a user of client device 102.

As another example, query performance engine 248 may be used to analyze query patterns and associated aggregate search activity statistics, particularly click rates, abandonment rates, click positions, etc., for a variety of performance-related purposes. Performance of query patterns may be gauged based on a variety of measures, including but not limited to click rate, mean reciprocal rank ("MRR"), abandonment rate, and so forth. These measures may be put to a variety of uses.

Suppose an experimental algorithm is implemented, e.g., on document storage system 104 or email system 106, to serve a particular subset of users (e.g., users having randomly selected IP addresses, users in a particular region, beta users, etc.) with search results. Suppose further that other, "control" users continue to receive search results using a legacy algorithm. To compare the experimental algorithm to the legacy algorithm, post-search activity associated with search queries submitted by the subset of users may be analyzed using techniques herein to identify query patterns and corresponding aggregate post-search activity statistics. These aggregate post-search activity statistics may then be compared, e.g., by query performance engine 248, to aggregate post-search activity statistics associated with query patterns generated for the legacy algorithm to determine how post-search activity changed between the two. If a particular query pattern performs highly for the legacy algorithm but poorly for the experimental algorithm, that may indicate that the experimental algorithm has one or more issues, such as bugs.

Query performance engine 248 may analyze query patterns for other purposes as well. In some implementations, query performance engine 248 may organize query activity statistics associated with search queries that match a given query pattern into groups based on various attributes, such as time-of-year, time-of-day, subject matter/themes, and so forth. For example, tax related queries will likely spike during tax season. This may be observed and/or documented (e.g., in index 246) by query performance engine 248. Other components, such as presentation engine 122 or ranking engine 124, may then use these observations to rank or otherwise present search results and/or other data/user interface elements to users differently during tax season than they would outside of tax season.

In yet other implementations, query performance engine 248 may monitor for changes to aggregate post-search activity statistics associated with query patterns over time. If there are sudden and/or dramatic changes to how users interact with interfaces presented in response to search queries that match a given query pattern, query performance engine 248 may take various actions, such as automatically notifying appropriate administrative personnel (e.g., administers of document storage system 104 or email system 106).

Figure 3:
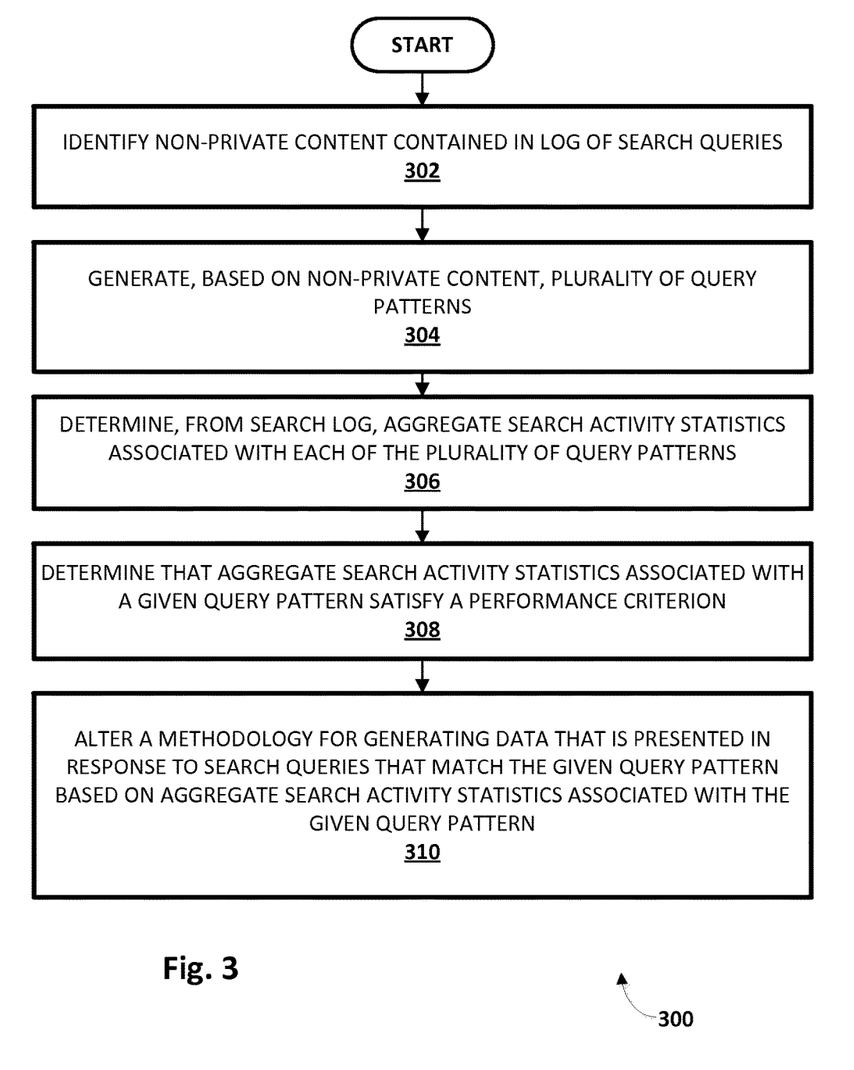
FIG. 3 depicts a flow chart illustrating an example method of generating query patterns and corresponding aggregate search activity statistics, and applying that information for various purposes, in accordance with various implementations.

Referring now to FIG. 3, an example method 300 of generating query patterns from search queries in search logs is depicted. For convenience, the operations of the flow chart are described with reference to a system that performs the operations. This system may include various components of various computer systems. Moreover, while operations of method 300 are shown in a particular order, this is not meant to be limiting. One or more operations may be reordered, omitted or added.

At block 302, the system may identify non-private content contained in search queries that are stored in a log of search queries, as described above with respect to privacy engine 240 of FIG. 2. For example, the privacy criterion may be satisfied by content such as n-grams that occur within the search log at a frequency that satisfies a frequency threshold, or by content such as n-grams that occur within the search log at least a minimum number of times. While n-grams are used herein to describe various examples, this is not meant to be limiting. In various implementations, content may be grouped and/or parsed into other types of units or tokens.

At block 304, the system may generate, based on the non-private content identified at block 302, a plurality of query patterns (e.g., $\{QP_1, QP_2, \ldots, QP_N\}$ described above and depicted in FIG. 2). For example, non-private content may be compared to each search query. Any content of a search query that does not match any non-private content identified at block 302 may be disregarded or discarded, e.g., because it may be deemed private. Other examples of how query patterns may be identified were described above with respect to query pattern generation engine 242 and FIG. 2.

At block 306, the system may determine, e.g., from search log 120, aggregate search activity associated with each of the plurality of query patterns that were generated at block 304. As noted above, this may include components such as query pattern statistics engine 244 depicted in FIG. 2 identifying general aggregate search activity statistics from search queries that match the query pattern, such as the number of matching search queries, number of unique matching search queries, timeframes when matching search queries are most-often submitted (or not typically submitted), and so forth. This may also include components such as query pattern statistics engine 244 identifying aggregate post-search activity statistics from post-search activity associated with search queries that match a given query pattern, such as click rate, click position, user interface elements presented/interacted with, abandonment rate, MRR, and so forth.

At block 308, the system may determine that aggregate search activity statistics (e.g., $\{ASAS_1, ASAS_2, \ldots, ASAS_P\}$ in FIG. 2) associated with a given query pattern satisfy a performance criterion. For example, presentation engine 122 may determine, e.g., in response to receiving a search query, that a query pattern that matches the received search query is associated with aggregate search activity statistics that satisfy an abandonment threshold. An abandonment threshold may be satisfied, for instance, by a click rate that is below a certain percentage, such as (but not limited to) below ten percent, below five percent, and so forth. As another example, query performance engine 248 may determine that, for an experimental search algorithm being used to provide search results to beta users, a particular query pattern experiences a significant change in performance.

In response to the determination at block 308, at block 310, the system may alter a methodology for generating data (e.g., HTML data for a search results webpage, data to be presented in at email client 114 or document client 116) that is presented in response to search queries that match the given query pattern. This alteration may be made based at least in part on aggregate search activity statistics associated with the given query pattern. For example, suppose it is determined at block 308 that users click on a particular user interface element provided in response to search queries that match a given query pattern at a particular frequency that satisfies a threshold (e.g., some minimum percentage). In response, the system may alter the methodology it uses to present the user interface element, e.g., by presenting it more prominently, surfacing it, or even presenting it in a totally new manner (e.g., as a pop up). Likewise, if the user interface element is clicked less than a minimum threshold of times, it may be presented less prominently or even no longer presented.

Figure 4:
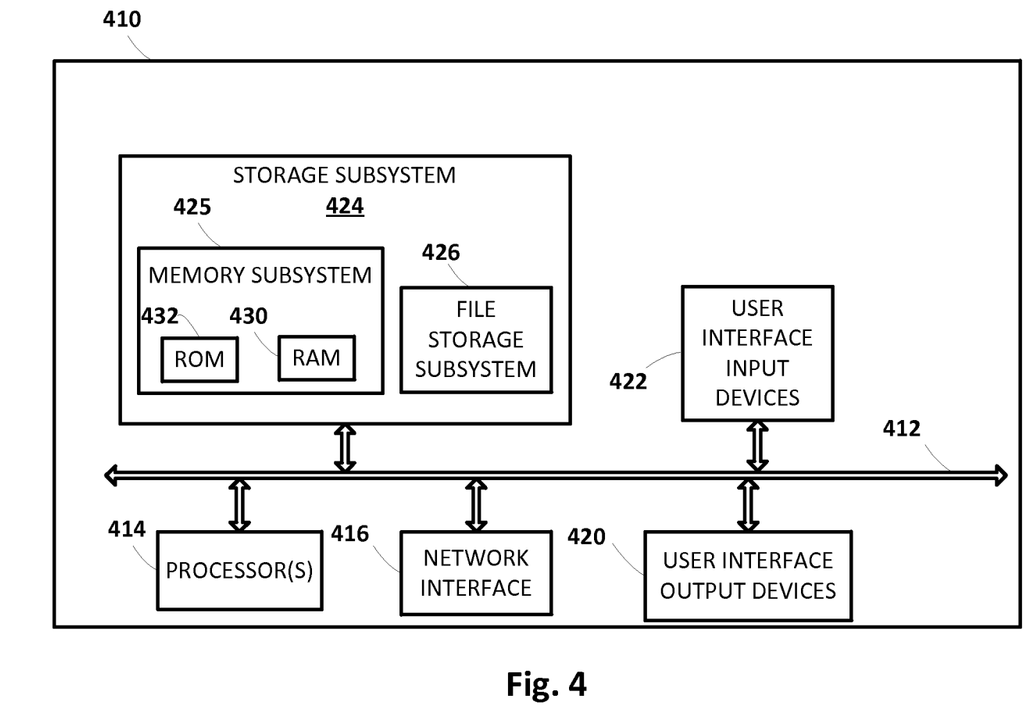
FIG. 4 schematically depicts an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300 and/or to implement one or more of presentation engine 122, ranking engine 124, one or more components of query analysis engine 126 (e.g., 240, 242, 244, 246, 248), document indexing engine 128, and/or email indexing engine 132.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:

identifying, within a search log of private search queries and corresponding post-search activity, a plurality of non-private n-grams that satisfy a privacy criterion and one or more private n-grams that do not satisfy the privacy criterion, wherein the plurality of non-private n-grams are contained in the private search queries;

generating, from the search log, based on the plurality of non-private n-grams, a plurality of query patterns, wherein at least some of the plurality of query patterns replace the one or more private n-grams that do not satisfy the privacy criterion with one or more wildcards;

determining, from the search log, aggregate search activity statistics associated with each respective query pattern of the plurality of query patterns, wherein the aggregate search activity statistics associated with each respective query pattern of the plurality of query patterns are indicative of search activity associated with a plurality of distinct private search queries that match the respective query pattern of the plurality of query patterns, wherein the plurality of distinct private search queries are part of the private search queries in the search log;

determining that the aggregate search activity statistics associated with a given query pattern of the plurality of query patterns satisfy a performance criterion;

receiving, from a remote computing device, over one or more computer networks, a search query;

based on a determination that the received search query matches the given query pattern of the plurality of query patterns and the determination that the aggregate search activity statistics associated with the given query pattern of the plurality of query patterns satisfied the performance criterion, ranking query suggestions or search results that are responsive to the received search query based at least in part on the aggregate search activity statistics associated with the given query pattern of the plurality of query patterns; and providing the ranked query suggestions or the ranked search results to the remote computing device over the one or more computer networks;

wherein the remote computing device presents one or more of the ranked query suggestions or one or more of the ranked search results in accordance with the respective rankings of the ranked query suggestions or the respective rankings of the ranked search results.

2. The computer-implemented method of claim 1, wherein the privacy criterion is satisfied by n-grams that occur within the search log at a frequency that satisfies a frequency threshold.

3. The computer-implemented method of claim 1, wherein the privacy criterion is satisfied by n-grams that occur within the search log at least a minimum number of times.

4. The computer-implemented method of claim 1, wherein the generating comprises generating a histogram of the plurality of non-private n-grams based on how frequently each of the plurality of non-private n-grams occurs among the private search queries in the search log.

5. The computer-implemented method of claim 1, wherein the aggregate search activity statistics associated with the given query pattern of the plurality of query patterns include a total number of search queries that match the given query pattern of the plurality of query patterns.

6. The computer-implemented method of claim 1, wherein the aggregate search activity statistics associated with the given query pattern of the plurality of query patterns include a number of distinct search queries that match the given query pattern of the plurality of query patterns.

7. The computer-implemented method of claim 1, wherein the aggregate search activity statistics associated with the given query pattern of the plurality of query patterns include aggregate statistics pertaining to post-search activity associated with a plurality of private search queries that match the given query pattern of the plurality of query patterns.

8. The computer-implemented method of claim 1, wherein the aggregate search activity statistics associated with the given query pattern of the plurality of query patterns include click position statistics associated with the given query pattern of the plurality of query patterns.

9. The computer-implemented method of claim 1, wherein the aggregate search activity statistics associated with the given query pattern of the plurality of query patterns include a click rate associated with the given query pattern of the plurality of query patterns.

10. The computer-implemented method of claim 1, wherein the aggregate search activity statistics associated with the given query pattern of the plurality of query patterns include an abandonment rate associated with the given query pattern of the plurality of query patterns.

11. The computer-implemented method of claim 10, wherein the aggregate search activity statistics associated with the given query pattern of the plurality of query patterns satisfied the performance criterion when the abandonment rate satisfies a minimum threshold.

12. A system including memory and one or more processors operable to execute instructions stored in the memory, to:

identify, within a search log of private search queries and corresponding post-search activity, a plurality of non-private n-grams that satisfy a privacy criterion and one or more private n-grams that do not satisfy the privacy criterion, wherein the plurality of non-private n-grams are contained in the private search queries;

generate, from the search log, based on the plurality of non-private n-grams, a plurality of query patterns, wherein at least some of the plurality of query patterns replace the one or more private n-grams that do not satisfy the privacy criterion with one or more wildcards;

determine, from the search log, aggregate search activity statistics associated with each respective query pattern of the plurality of query patterns, wherein the aggregate search activity statistics associated with each respective query pattern of the plurality of query patterns are indicative of search activity associated with a plurality of distinct private search queries that match the respective query pattern of the plurality of query patterns, wherein the plurality of distinct private search queries are part of the private search queries in the search log;

determine that the aggregate search activity statistics associated with a given query pattern of the plurality of query patterns satisfy a performance criterion;

receive, from a remote computing device, over one or more computer networks, a search query;

based on a determination that the received search query matches the given query pattern of the plurality of query patterns and the determination that the aggregate search activity statistics associated with the given query pattern of the plurality of query patterns satisfied the performance criterion, rank query suggestions or search results that are responsive to the received search query at least in part based on the aggregate search activity statistics associated with the given query pattern of the plurality of query patterns; and provide the ranked query suggestions or the ranked search results to the remote computing device over the one or more computer networks;

wherein the remote computing device presents one or more of the ranked query suggestions or one or more of the ranked search results in accordance with the respective rankings of the ranked query suggestions or the respective rankings of the ranked search results.

13. The system of claim 12, wherein the privacy criterion is satisfied by n-grams that occur within the search log at a frequency that satisfies a frequency threshold, or by n-grams that occur within the search log at least a minimum number of times.

14. The system of claim 12, wherein the privacy criterion is satisfied by n-grams that occur within the search log at least a minimum number of times.

15. The system of claim 12, wherein the generating comprises generating a histogram of the plurality of non-private n-grams based on how frequently the plurality of non-private n-grams occur among the private search queries in the search log.

16. At least one non-transitory computer-readable medium comprising instructions that, in response to execution of the instructions by a computing system, cause the computing system to perform operations comprising:

identifying, within a search log of private search queries and corresponding post-search activity, non-private content that satisfies a privacy criterion and private content that does not satisfy the privacy criterion, wherein the non-private content is contained in the private search queries;

generating, from the search log, based on the non-private content, a plurality of query patterns, wherein at least some of the plurality of query patterns replace the private content that does not satisfy the privacy criterion with one or more wildcards;

determining, from the search log, aggregate search activity statistics associated with each respective query pattern of the plurality of query patterns, wherein the aggregate search activity statistics associated with each respective query pattern of the plurality of query patterns are indicative of search activity associated with a plurality of distinct private search queries that match the respective query pattern of the plurality of query patterns, wherein the plurality of distinct private search queries are part of the private search queries in the search log;

determining that the aggregate search activity statistics associated with a given query pattern of the plurality of query patterns satisfy a performance criterion;

receive, from a remote computing device, over one or more computer networks, a search query;

based on a determination that the received search query matches the given query pattern of the plurality of query patterns and the determination that the aggregate search activity statistics associated with the given query pattern of the plurality of query patterns satisfied the performance criterion, altering a methodology for generating data that is presented in response to the received search query based on the aggregate search activity statistics associated with the given query pattern of the plurality of query patterns; and provide the data to the remote computing device over the one or more computer networks;

wherein the remote computing device presents the data pursuant to the altered methodology.

\* \* \* \* \*